United States Patent [19]
Tekinay

[11] Patent Number: 6,044,273
[45] Date of Patent: Mar. 28, 2000

[54] METHOD AND APPARATUS FOR DESIGNING A COMMUNICATION SYSTEM BY MODELING SPATIAL AND TEMPORAL BEHAVIOR OF USER MOBILITY DEMAND

[75] Inventor: Sirin Tekinay, Mahwah, N.J.

[73] Assignee: Northern Telecom Limited, Montreal, Canada

[21] Appl. No.: 08/763,567

[22] Filed: Dec. 10, 1996

[51] Int. Cl.$^7$ ................................................ H04B 15/00
[52] U.S. Cl. ........................... 455/446; 455/448; 455/449
[58] Field of Search .................................. 455/67.1, 446, 455/447, 448, 449, 453, 524, 525

[56] References Cited

U.S. PATENT DOCUMENTS

| | | | |
|---|---|---|---|
| 5,095,500 | 3/1992 | Tayloe et al. | 455/446 |
| 5,134,709 | 7/1992 | Bi et al. | 455/452 |
| 5,152,002 | 9/1992 | Leslie et al. | 455/446 |
| 5,241,685 | 8/1993 | Bodin et al. | 455/453 |
| 5,285,494 | 2/1994 | Sprecher et al. | 455/446 |
| 5,293,640 | 3/1994 | Gunmar et al. | 455/446 |
| 5,428,815 | 6/1995 | Grube | 455/447 |
| 5,448,621 | 9/1995 | Knudsen | 455/453 |
| 5,504,937 | 4/1996 | Kangas | 455/453 |
| 5,561,839 | 10/1996 | Osterberg et al. | 455/446 |
| 5,561,841 | 10/1996 | Markus | 455/446 |

OTHER PUBLICATIONS

Markov/Gibbs modeling: Texture and Temperature, R. Picard and A. Pentland, SPIE vol. 1607 Intelligent Robots and Computer Vision X: Algorithms and Techniques, pp. 15–26, 1991.

Markov/Gibbs Texture Modeling: Aura Matrices and Temp. Effects, R. Picard, I. Elfadel, and A. Pentland Proceedings of IEEE Computer Society Conference on Computer Vision and Pattern Recognition, pp. 371–377, 1991.

Shading into Texture, A. Pentland, Artificial Intelligence, vol. 29, No. 2, pp. 147–170, Aug. 1986.

Fractional Brownian Motion Models for Synthetic Aperture Radar Imagery Scene Segmentation, C. Stewart, B. Moghaddam and K. Hintz, Proceedings of IEEE, Special Section on Applications of Fractals in Electrical Engineering, pp. 1–34, Oct. 1993.

Fractal image compression and texture analysis, B. Moghaddam, K. Hintz and C. Stewart, SPIE vol. 1406, Image Understanding in the '90s: Building Systems that Work, pp. 42–57, 1990.

Fractal–Based Description of Natural Scenes, A. Pentland, IEEE Transactions on Pattern Analysis and Machine Intelligence, vol. PAMI–6, No. 6, pp. 661–674, Nov. 1984.

Channel Occupancy Time Distribution in a Cellular Radio System, R. Guerin, IEEE Transactions on Vehicular Technology, vol. VT–35 No. 3, pp. 89=99, Aug. 1987.

Handoff Effects in Microcellular Systems, X. Luo and D. Everitt, Proceedings of the IEEE Vehicular Technology Conference, vol. 2, pp. 654–657, 1992.

Performance Aspects of the GSM Radio Subsystem, W. Fuhrmann and V. Brass, Proceedings of the IEEE, vol. 82, No. 9, pp. 1449–1446, Sep. 1994.

Traffic Models for Wireless Communication Networks, K. Leung, W. Massey and W. Whitt, IEEE Journal On Selected Areas in Communications, vol. 12, No. 8, pp. 1353–1364, Oct. 1994.

An Approach to Modeling Subscriber Mobility in Cellular Radio Networks, G. Morales–Andres, Proceedings Of the IEEE Vehicular Technology Conference, pp. 185–189, 1987.

*Primary Examiner*—Daniel S. Hunter
*Assistant Examiner*—Thuan T. Nguyen
*Attorney, Agent, or Firm*—John D. Crane

[57] ABSTRACT

A method and apparatus for designing a communication system where user call demand is estimated based on spatial and temporal distributions. Base stations and cell grids are then designed to accommodate the estimated user call demand, while user mobility demand is estimated based on spatial and temporal distributions developed for geographic subregions with self-similar mobility patterns. An MSC network is then designed to service both the base stations and cell grids, and the estimated user mobility demand.

5 Claims, 6 Drawing Sheets

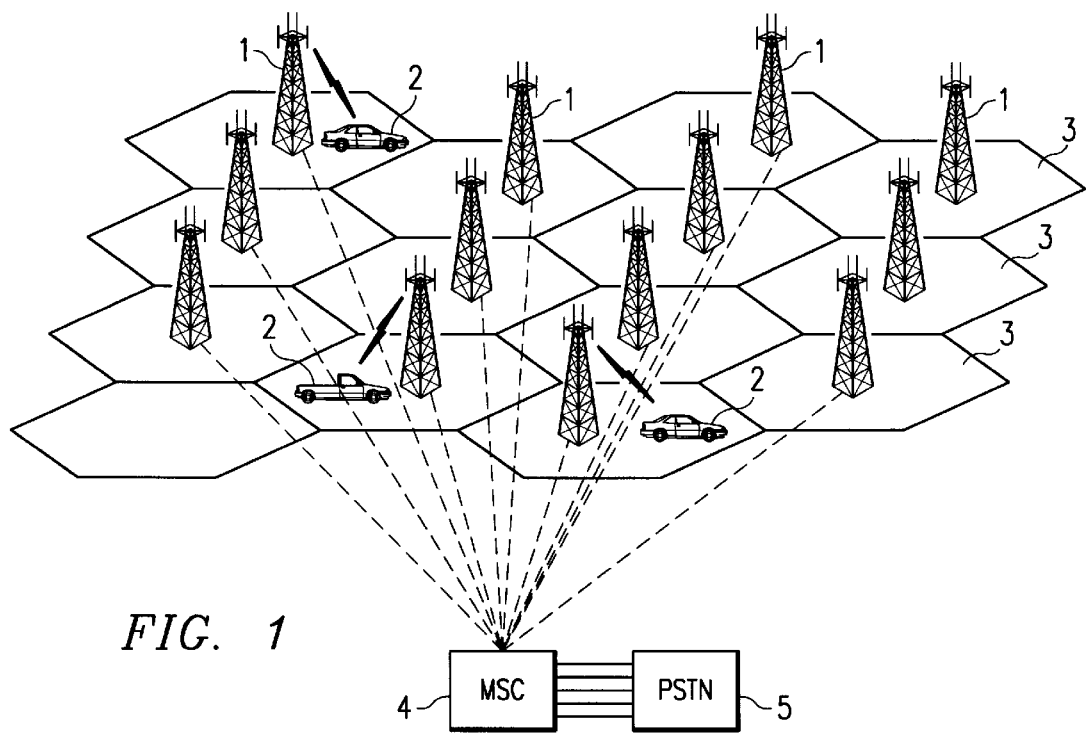
FIG. 1
FIG. 2
▨ = HIGH POPULATION DENSITY
☐ = LOW POPULATION DENSITY

P = PRIMARY HIGHWAYS
S = SECONDARY HIGHWAYS

○ USER
⇨ VELOCITY

METHOD AND APPARATUS FOR DESIGNING A COMMUNICATION SYSTEM BY MODELING SPATIAL AND TEMPORAL BEHAVIOR OF USER MOBILITY DEMAND

FIELD OF THE INVENTION

The present invention relates to a method and apparatus for designing a communication system and, more particularly, to a method and apparatus for designing a communication system by modeling spatial and temporal behavior of user demand.

BACKGROUND OF THE INVENTION

FIG. 1 shows a communication system which services a demand generated from a set of mobile users 2. The communication system includes base stations 1 which handle communications with the mobile users 2 in defined geographic areas 3 know as cells. Specifically, each base station 1 functions as a communication bridge between all mobile users 2 within its cell 3 and a mobile switching center (MSC) 4. The MSC 4 coordinates all the activities of the base stations 1 and connects the base stations 1 to a public switched telephone network (PSTN) 5.

Communication systems, such as the one shown in FIG. 1, are designed to service an estimated user demand. User demand is conventionally estimated by focusing on the calling frequency of the mobile users 2. User demand based on these behavioral patterns is generally known in the art as user call demand. User call demand is usually represented by factors such as calls/user, message-services/user, and pages/user, where each of these factors are calculated for a given time period during which the communication system experiences its heaviest use.

Factors which represent user call demand are modeled by using spatial and temporal distributions. FIG. 2 shows an example of a spatial distribution for user call demand. In FIG. 2, based on known demographics, various geographic areas are designated as having a high population density (HPD) of users, where other areas are designated as having a low population density (LPD) of users. The HPD areas are generally those geographic areas which will produce a large number of calls such as business districts. The LPD areas, on the other hand, are those geographic areas which generally produce a small number of calls such as a suburbs.

FIGS. 3(*a*) and 3(*b*) are examples of temporal distributions used to model user call demand. The temporal distributions shown in FIGS. 3(*a*) and 3(*b*) are based on the spatial distribution shown in FIG. 2. Specifically, FIG. 3(*a*) shows an example of a temporal distribution which represents calls/user for the HPD areas, whereas, FIG. 3(*b*) shows an example of a temporal distribution which represents calls/user for the LPD areas.

A review of FIGS. 3(*a*) and 3(*b*) indicates, for example, that the peak number of calls/user in the HPD areas is estimated to be 1.7 at 6:00 PM, and the peak number of calls/user in the LPD areas is estimated to be 0.95 at 7:00 PM. Based on these peak values, and the peak values for the other factors discussed above, a complete model of user call demand can be developed.

FIG. 4 shows a conventional method for designing a communication system. In the conventional method, a first step 6 involves modeling user call demand in accordance with the techniques discussed above. The next step 8, which is sometimes referred to as RF planning, involves designing a grid of base stations and cells to accommodate the estimated user call demand. And the third step 10, which is sometimes referred to as network planning, involves designing one or more MSC networks to service the base stations and cells. The result of the conventional method is a preliminary design of a communication system 12.

The conventional method for designing a communication system does, however, have certain drawbacks. The conventional method only takes into account user call demand and fails to address other behavioral patterns of users which could result in a demand being placed on the communication system. In particular, while the conventional method accounts for a demand based on the calling frequency of the user, it fails to properly account for a demand based on the mobility of the user.

Many shortcomings result when user mobility demand is not adequately considered during the design of a communication system. First, by not taking into account the user mobility aspect of demand, a resulting communication system will be ill-equipped to service a peak user demand. Moreover, when the mobility factors are not considered during the design phase, the resources of the communication will not operate in an optimal manner. These two drawbacks, among others, will ultimately result in a communication system which does not adequately and effectively service the user community.

OBJECTS AND SUMMARY OF THE INVENTION

It is accordingly an object of this invention to develop a method and apparatus for designing a communication system which takes into account the user mobility component of demand.

It is another object of the invention to develop a method and apparatus for designing a communication system which efficiently utilizes all system resources to provide the best possible service to all users of the communication system at the lowest possible cost.

In accordance with one aspect of the invention, a method for designing a communication system is defined, where the method comprises the steps of: (1) modeling spatial and temporal behavior of user call demand; (2) designing base stations and cell grids to service the user call demand; (3) modeling spatial and temporal behavior of user mobility demand; and, (4) designing a MSC network to service the base stations and cell grids and the user mobility demand.

In accordance with another aspect of the invention, step (3) of the method above includes the substeps of: (a) modeling spatial behavior of user mobility demand by identifying and confirming self-similar geographic subregions; (b) modeling temporal behavior of user mobility demand for each self-similar subregion identified; (c) revising the modeling spatial and temporal behavior of user call demand; and, (d) developing an aggregate user demand.

In accordance with yet another aspect of the invention the self-similar geographic subregions are identified by using at least one of a manual technique and an automated technique.

In accordance with still another aspect of the invention, the identified self-similar geographic subregions are confirmed as being self-similar by placing a hypothetical line across each subregion and measuring, during a given unit of time, the frequency with which users cross the hypothetical line.

In accordance with even still another aspect of the invention, the temporal behavior of user mobility is modeled for factors including handoffs/call/user, location updates/call/user, and registrations/call/user.

In accordance with even another aspect of the invention, the step of modeling spatial and temporal behavior of user mobility demand is performed simultaneously with said step of designing base stations and cell grids to service the user call demand.

In accordance with still another aspect of the invention, the step of modeling spatial and temporal behavior of user mobility demand is performed subsequently to said step of designing base stations and cell grids to service the user call demand.

In accordance with another aspect of the invention, a method for identifying and confirming subregions with self-similar mobility patterns is defined, where the method comprises the steps of: (1) identifying self-similar geographic subregions by using a at least one of a manual technique and an automated technique; and, (2) confirming that said identified self-similar geographic subregions are self-similar by placing a hypothetical line across each subregion and measuring, during a given unit of time, the frequency with which users cross the hypothetical line.

In accordance with even another aspect of the invention, an apparatus for designing a communication system is defined, where the apparatus comprises: means for modeling spatial and temporal behavior of user call demand; means for designing base stations and cell grids to service the user call demand; means for modeling spatial and temporal behavior of user mobility demand; and, means for designing a MSC network to service the base stations and cell grids and the user mobility demand.

In accordance with another aspect of the invention, the means for modeling spatial and temporal behavior of user mobility demand includes: means for modeling spatial behavior of user mobility demand by identifying and confirming self-similar geographic subregions; means for modeling temporal behavior of user mobility demand for each identified self-similar subregion; means for revising the spatial and temporal behavior of user call demand ordinally modeled by the means for modeling spatial and temporal behavior of user call demand; and, means for developing an aggregate user demand.

BRIEF DESCRIPTION OF THE DRAWINGS

The accompanying drawings are included to provide an understanding of the invention and constitute a part of the specification.

FIG. 1 illustrates a conventional communication system which services a mobile set of users;

FIG. 2 illustrates a spatial distribution which is used to model user call demand;

DETAILED DESCRIPTION OF THE INVENTION

Figure 3A:
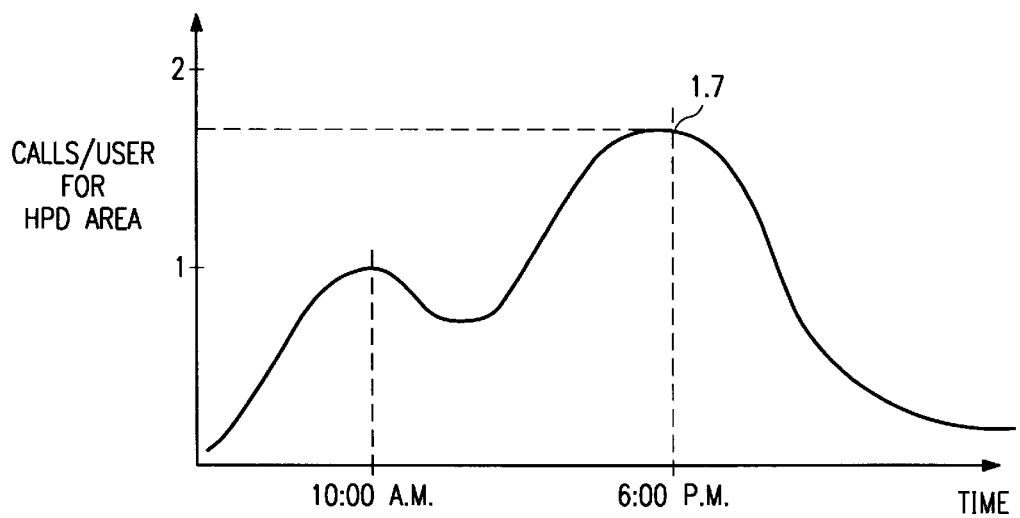
FIGS. 3(a) and 3(b) illustrate temporal distributions used to model user call demand which are based on the spatial distribution shown in FIG. 2.
Figure 3B:
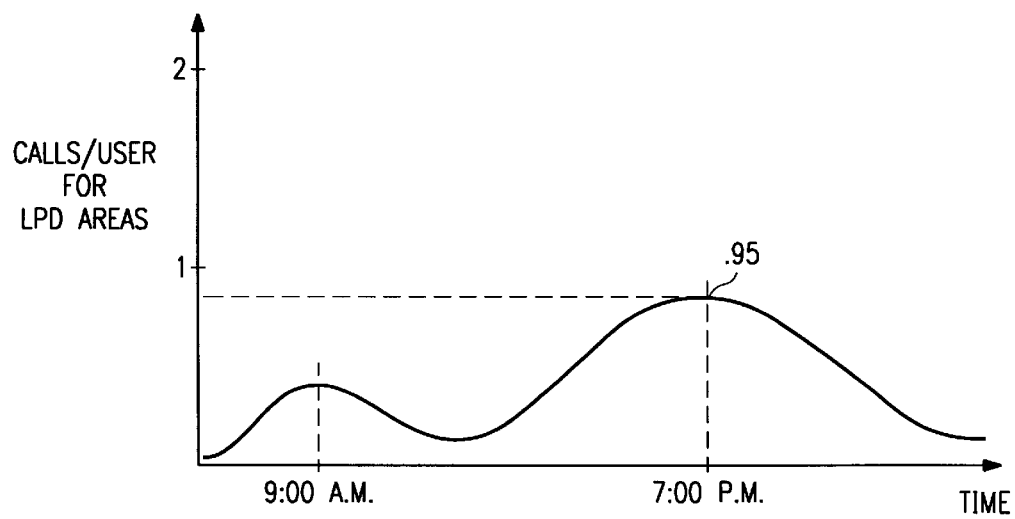
Figure 4:
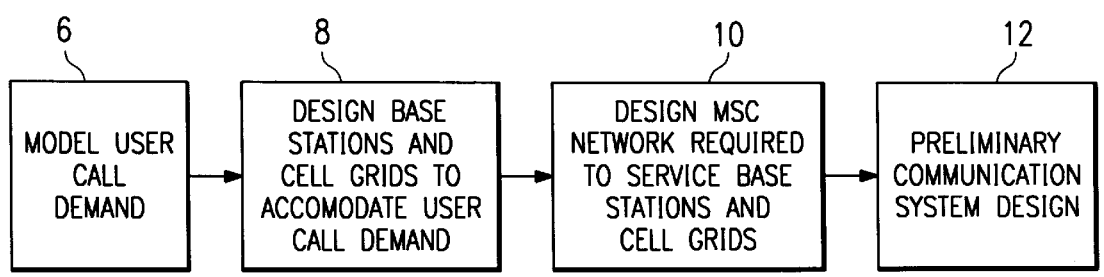
FIG. 4 illustrates a conventional method or apparatus for designing a communication system.
Figure 5:
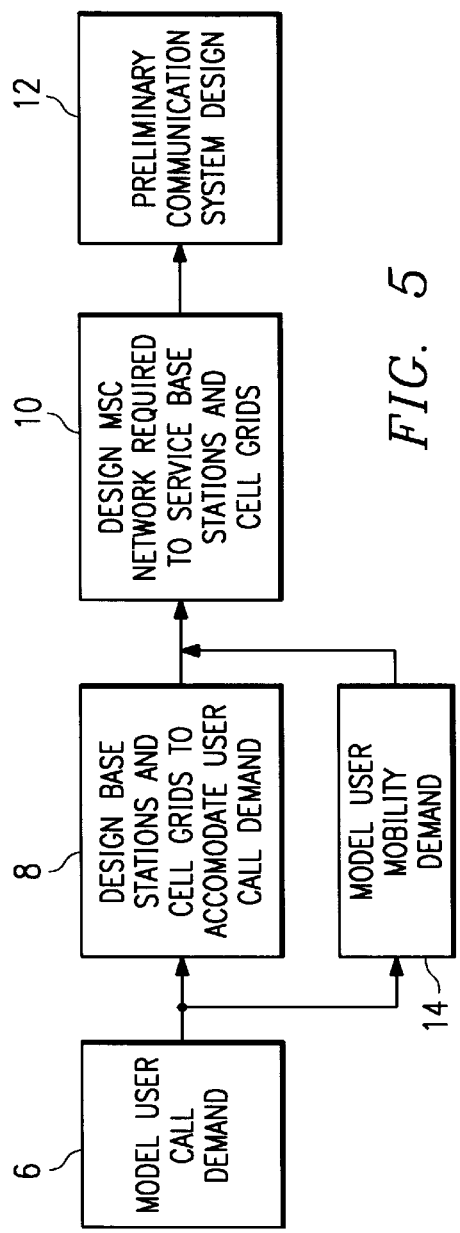
FIG. 5 illustrates a method or apparatus for designing a communication system in accordance with the present invention.

FIG. 5 shows a method for designing a communication system in accordance with the present invention. Referring to FIG. 5, the first step 6 in the method involves modeling user call demand in accordance with known modeling techniques.

The next two steps in the method, which are performed in parallel, are shown as steps 8 and 14. Step 8 involves designing the system's base stations and cells to service the modeled user call demand, where step 14 involves defining and modeling user mobility demand.

Figure 6:
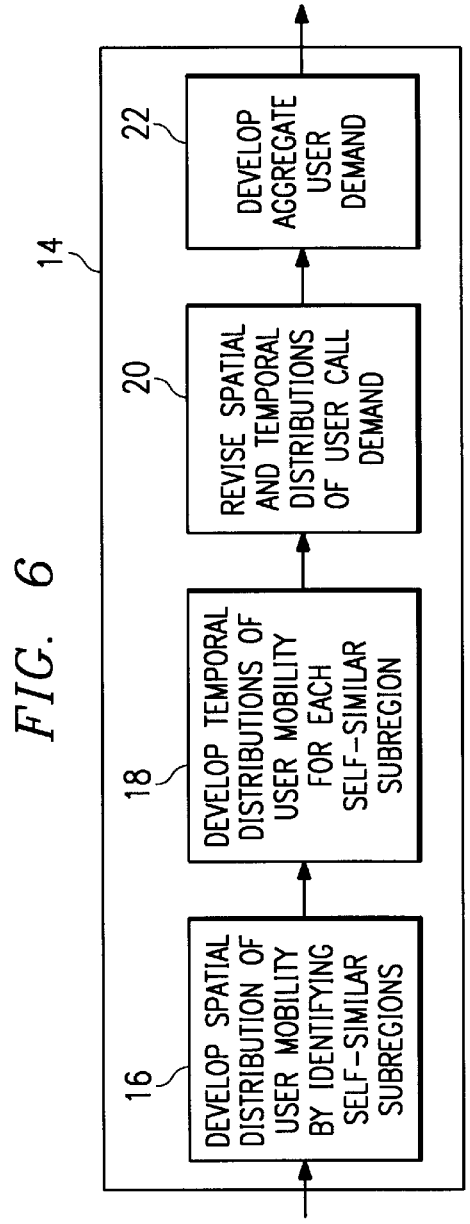
FIG. 6 illustrates a method or apparatus for modeling user mobility demand in accordance with the present invention.

FIG. 6 shows the substeps performed at step 14 by system planners to model user mobility demand in accordance with the present invention. Specifically, at substep 16 system planners first develop a spatial distribution of user mobility based on those geographical subregions in which the mobility patterns of the user are determined to be self-similar.

Figure 7:
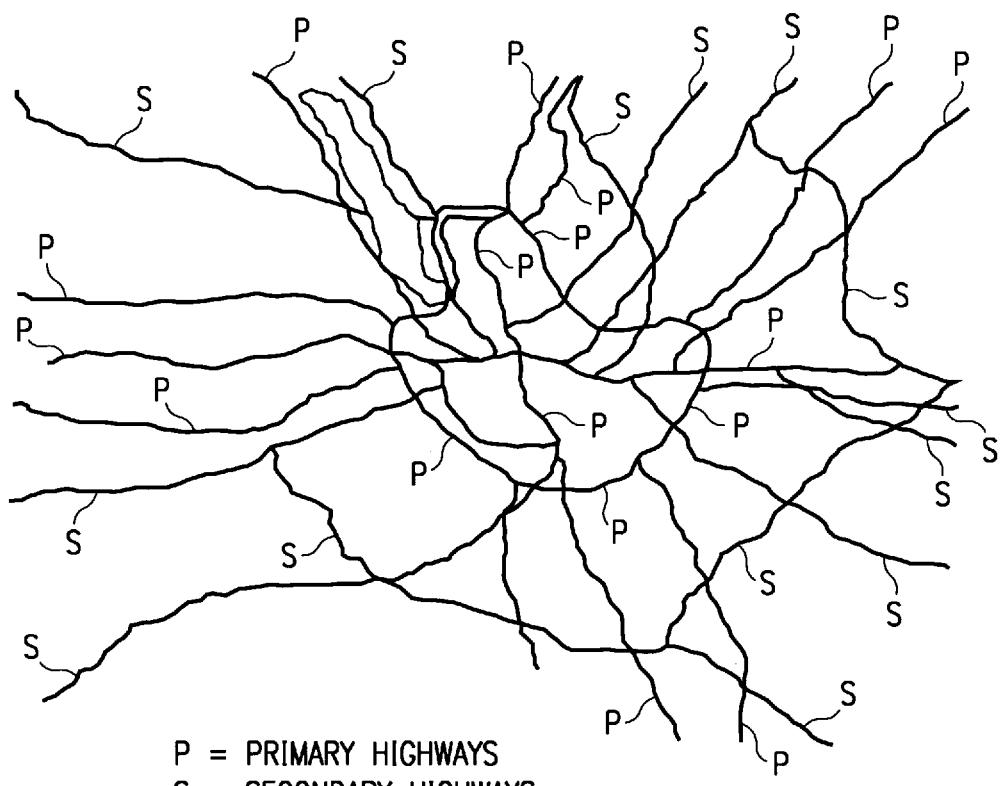
FIG. 7 illustrates a spatial distribution used to model user mobility demand which was developed in accordance with the present invention.

FIG. 7 shows an example of a spatial distribution of user mobility demand developed at substep 16 by identifying self-similar geographic subregions. In this spatial distribution, primary highways P represent a first geographical subregion in which users of the communication system are determined to have self-similar mobility patterns, whereas, secondary highways S represent another geographical subregion in which users of the communication system are known to have a different self-similar mobility pattern.

A key to developing a spatial distribution of user mobility demand, such as the one shown in FIG. 7, centers on the ability to correctly identify and confirm those geographic subregions with self-similar mobility patterns.

Geographic subregions having self-similar mobility characteristics are initially identified by either a manual analysis or an automated analysis. After this initial analysis is performed, a secondary analysis is performed to confirm that the subregions do indeed maintain self-similar mobility patterns.

A manual analysis for initially identifying geographic subregions with selfsimilar mobility characteristics would include manually reviewing topographical maps of a geographic area and identifying those subregions, such as highways or train lines, in which users would be considered to have a high degree of mobility.

An automated analysis would include, for example, obtaining a digital image of a geographic area from an earth-orbiting spacecraft, such as a satellite or plane. The digital image can be obtained by using known synthetic aperture radar (SAR) imaging techniques or known infrared imaging techniques. Once the digital image is obtained, it can be fed to a computer which will use known algorithms to automatically identify those areas with self-similar patterns or textures.

Algorithms used to image the earth's surface are well known in the art and described, for example, in (i) "Markov/Gibbs Modeling: Texture and Temperature," R. Picard and A. Pentland, SPIE Vol. 1607, 1991, pages 15–26; (ii) "Markov/Gibbs Texture Modeling: Aura Matrices and Temperature Effects," R. Picard, I. Elfadel, and A. Pentland, Proceedings of IEEE Computer Society Conference on Computer Vision and Pattern Recognition, 1991, pages 371–377; (iii) "Shading into Texture," A. Pentland, Artificial Intelligence, Vol 29, No. 2, pages 147–170, August 1986; (iv) "Fractional Brownian Motion Models for Synthetic Aperture Radar Imagery Scene Segmentation," C. Stewart, B. Moghaddam and K. Hintz, Proceedings of IEEE Special Section of Applications of Fractals in Electrical Engineering, pages 1–34, 1993; (v) "Fractal Image Compression and Texture Analysis," B. Moghaddam, K. J. Hintz and C. Stewart, SPIE Vol. 1406, pages 42–57, 1990; and, (vi) "Fractal Based Description for Natural Scenes," A. Pentland, IEEE Transactions on Pattern Analysis and Machine Intelligence, Vol. PAMI-6, No. 6, pages 661–674, 1984. These documents are hereby incorporated by reference as if set forth fully herein.

Subregions initially identified as having a self-similar mobility pattern, by either the manual or automated techniques discussed above, are then confirmed as having a self-similar mobility pattern by conducting a second test which further evaluates the subregion. The second test requires placing a hypothetical line across each subregion and measuring, during a given unit of time, the frequency with which users cross the hypothetical line. Subregions with a self-similar mobility pattern will be defined by those areas in which the number of occurrences where the hypothetical line is crossed by a user, during the given unit if time, is roughly constant.

Figure 8:
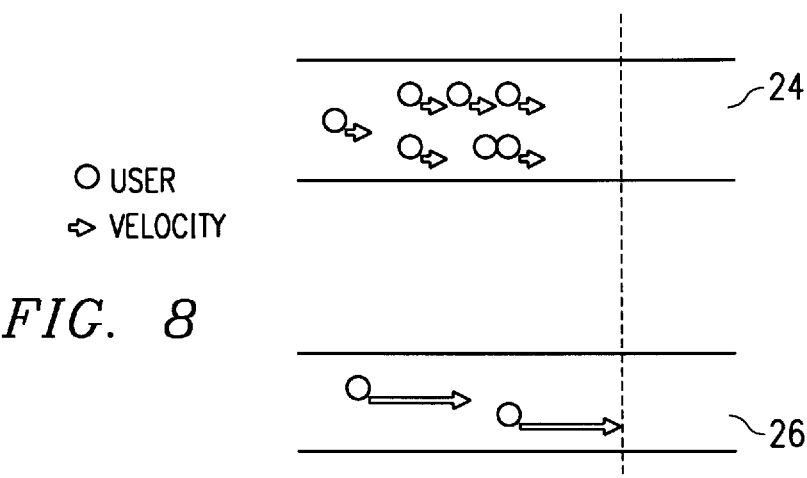
FIG. 8 illustrates two highways with different populations which have self-similar mobility patterns.

FIG. 8 shows an example of how two subregions 24 and 26, which have different characteristics, can have self-similar user mobility patterns. In FIG. 8, subregions 24 and 26, which are assumed to be a known highway or train line, include a certain number of users having a certain mobility characteristic. As is clear from this example, the subregion 24 which includes a large number of users having a low velocity may be self-similar to the subregion 26 which includes a low number of users with a high velocity. This is due to the fact that both factors can impact the determination.

Once the spatial distributions of user mobility demand are defined by identifying and confirming the existence of self similar subregions, corresponding temporal distributions are developed. Specifically, as shown in FIG. 6, the next substep 18 according to the invention will involve developing temporal distributions of user mobility demand for each self-similar subregion defined in substep 16. These distributions are developed for various factors known to represent user mobility such as handoffs/call/user, location updates/call/user, and registrations/call/user.

Figure 9A:
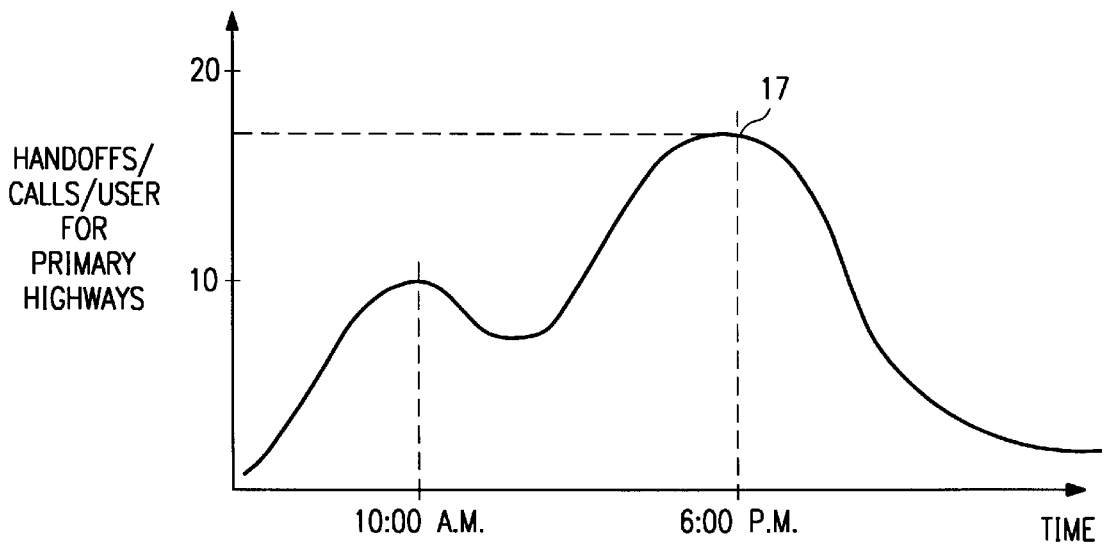
FIGS. 9(a) and 9(b) illustrate temporal distributions used to model user mobility demand which are based on the spatial distribution shown in FIG. 7.
Figure 9B:
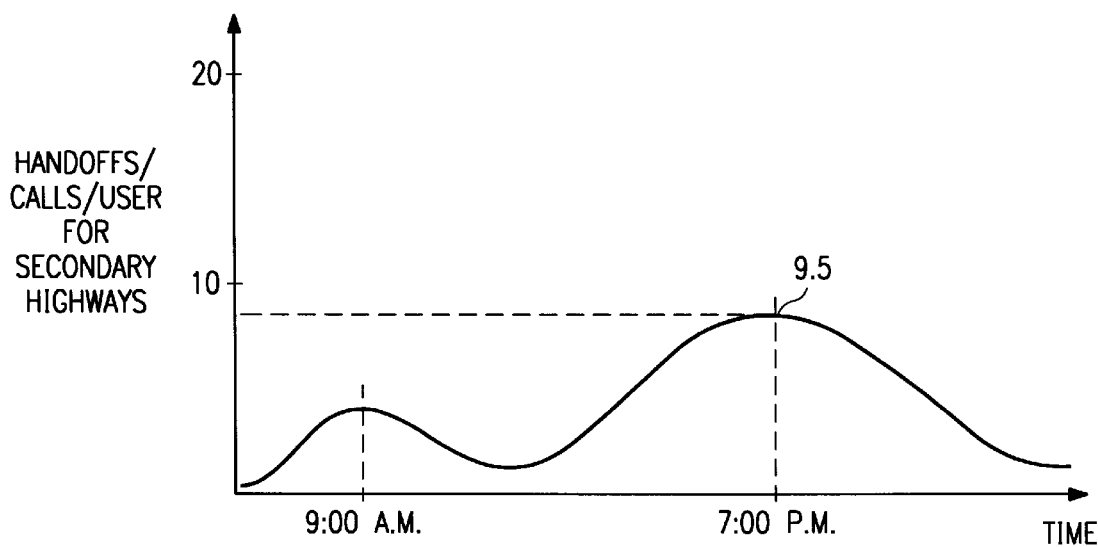

FIGS. 9(a) and 9(b) are examples of temporal distributions developed based on the spatial distribution of user mobility demand shown in FIG. 7. FIG. 9(a) shows an example of a temporal distribution of handoffs/call/user for the primary highways, whereas, FIG. 9(b) shows an example of a temporal distribution of handoffs/call/user for the secondary highways. A review of FIGS. 9(a) and 9(b) shows that the peak number of handoffs/calls/user traveling on the primary highways is estimated to be 17 at 6:00 PM, whereas, the peak number of handoffs/call/user traveling of the secondary highways is estimated to be 9.5 at 7:00 PM.

The next substep 20, according to the invention as shown in FIG. 6, involves revising the spatial and temporal distributions of user call demand developed at step 6. Specifically, at substep 20, these distribution patterns will be revised based on the information obtained from the spatial and temporal distribution of user mobility developed at substeps 16 and 18. For example, the user mobility models may indicate that the mobility behavioral patterns of the users significantly impact the HPD and LPD areas previously defined in the user frequency models and that these aspects of the user frequency models need revised. If this is the case, user frequency models are adjusted and a revised user call demand is determined.

The next substep 22 of the invention involves developing an aggregate user demand which takes into account both the revised user call demand and newly developed user mobility demand. Once the aggregate user demand is developed, step 14 will be complete.

The next step in the method, as shown in FIG. 5, will be step 10 which involves designing the MSC network to service the communication system. On this occurs, the result will be a preliminary design of a communication system 12.

Figure 10:
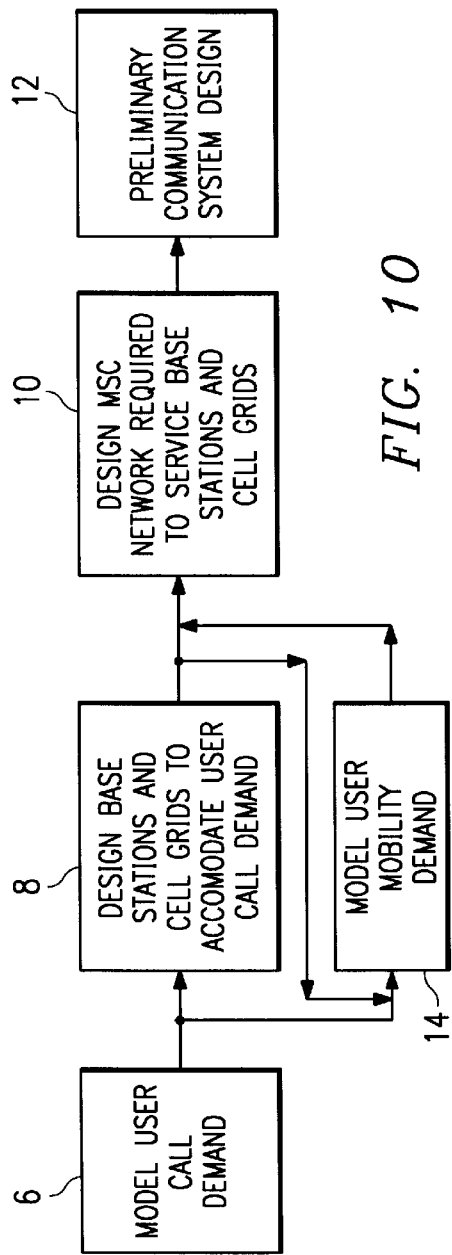
FIG. 10 illustrates a method or apparatus for designing a communication system in accordance with a first alternative embodiment of the present invention.

The present invention can be implemented by using alternative embodiments. Referring to the alternative embodiment shown in FIG. 10, the system planners at step 14 rely not only on the results from step 6, but also on the results of step 8. Moreover, in this embodiment, the system planners at step 14 receive the results from step 6 first and then subsequently receive the results of step 8.

Figure 11:
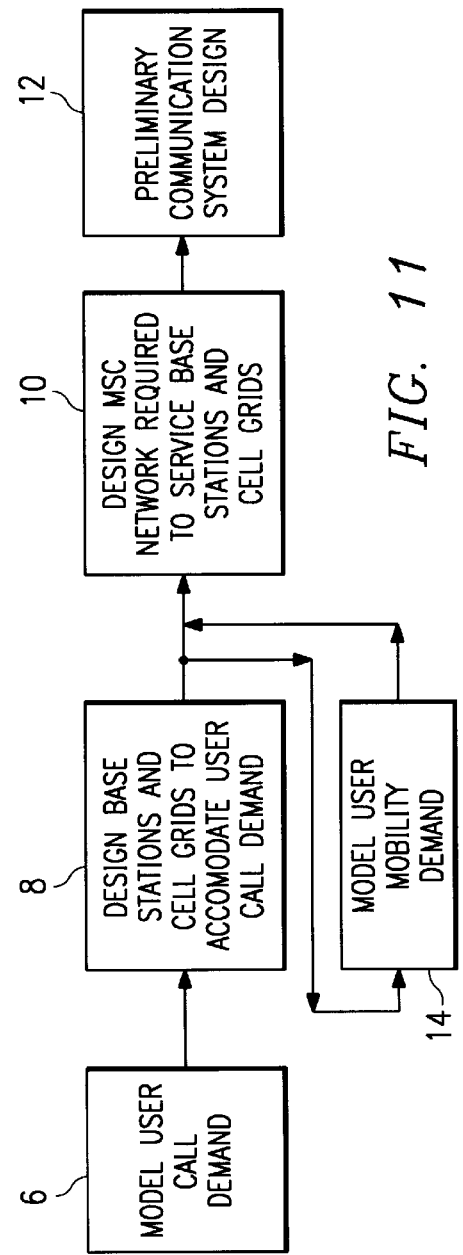
FIG. 11 illustrates a method or apparatus for designing a communication system in accordance with a second alternative embodiment of the present invention.

Referring to the alternative embodiment of the invention shown in FIG. 11, the system planners here again rely on both the results of step 6 and 8, however, the system planners do not receive these results until the step 8 is completed. All other aspects of these embodiments remain the same as those discussed above.

Also, even though the above description refers mostly to a method for practicing the invention, it is clear that the invention can also be practiced by using a computerized management information system which performs each of the steps described above.

The present invention is not to be considered limited in scope by the preferred embodiments described in the specification. Other advantages and modifications, which will readily occur to those skilled in the art from consideration of the specification and practice of the invention, are intended to be within the scope and spirit of the following claims.

I claim:

1. A method for designing a communication system of the type which includes one or more cells, each served by a corresponding base station, and one or more MSC's serving the base stations, the cells lying within and across geogaphic regions and sub-regions, the sub-regions being travel and commutation pathways for users through and between the regions, wherein the method comprises the steps of:

(1) modeling the spatial and temporal behavior of user call demand within each region;

(2) identifying the location of the base stations and cell grids required to service the user call demand identified in step (1);

(3) modeling the spatial and temporal behavior of user mobility demand by the following procedure:

(a) identifying and confirming self-similar geographic subregions by determining the number of users crossing a hypothetical boundary in each subregion during a predetermined time period and treating as self-similar those subregions in which the numbers of boundary-crossing users during the time period are substantially the same;

(b) modeling the temporal behavior of user mobility demand for each self-similar subregion identified in substep (3)(a);

(c) revising the modeling of the spatial and temporal behavior of user call demand effected in step (1) pursuant to substep (3)(b); and, (d) developing an aggregate user demand made up of the revised user call demand of substep (3)(c) and the user mobility demand of substep (3)(b); and, (4) designing a MSC network to service the base stations and cell grids from step (2) and the aggregate user demand identified in step (3).

2. A method for designing a communication system according claim 1, wherein said temporal behavior of user mobility demand is modeled in substep (3)(b) for one or more factors including handoffs/call/user, location updates/call/user, and registrations/call/user.

3. Apparatus for designing a communication system of the type which includes one or more cells, each served by a corresponding base station, and one or more MSC's base stations, the cells lying within and across geographic regions and sub-regions, the sub-regions being travel and commutation pathways for users through and between the regions, wherein the apparatus comprises:

first means for modeling the spatial and temporal behavior of user call demand within each region;

second means for identifying the location of the base stations and cell grids required to service the user call demand;

third means for modeling the spatial and temporal behavior of user mobility demand, the modeling means including the following sub-elements:

(a) means for identifying and confirming self-similar geographic subregions by determining the number of users crossing a hypothetical boundary in each subregion during a predetermined time period and treating as self-similar those subregions in which the numbers if boundary-crossing users during the time period are substantially the same, (b) means for modeling the temporal behavior of user mobility demand for each self-similar subregion identified by sub-element (a), (c) means for revising the modeling of the spatial and temporal behavior of user call demand effected by the first means in accordance with the functioning of subelement (b), and (d) means for developing an aggregate user demand made up of the revised user call demand of subelement (c) and the user mobility demand of subelement (b); and, means for designing a MSC network to service the base stations and cell grids identified by the second means in a system having the aggregate demand developed by subelement (d).

4. An apparatus for designing a communication system according to claim 3, wherein said means for modeling spatial and temporal behavior of user mobility demand includes:

means for modeling spatial behavior of user mobility demand by identifying and confirming self-similar geographic subregions;

means for modeling temporal behavior of user mobility demand for each identified self-similar subregion;

means for revising the spatial and temporal behavior of user call demand ordinally modeled by said means for modeling spatial and temporal behavior of user call demand; and, means for developing an aggregate user demand.

5. Apparatus as set forth in claim 4, wherein said temporal behavior of user mobility demand is modeled by subelement (b) for one or more factors including handoffs/call/user, location updates/call/user, and registrations/call/user.

* * * * *